(12) United States Patent
Aoki

(10) Patent No.: US 6,786,104 B1
(45) Date of Patent: Sep. 7, 2004

(54) SEAT WEIGHT MEASURING APPARATUS

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/704,839

(22) Filed: Nov. 3, 2000

Related U.S. Application Data

(60) Provisional application No. 60/163,388, filed on Nov. 4, 1999.

(51) Int. Cl.$^7$ ................................................ G10L 1/04
(52) U.S. Cl. ................................................. 73/862.472
(58) Field of Search ..................... 73/862.391, 862.451, 73/862.46, 862.472, 864.471, 862.473, 862.474, 862.61; 280/735; 180/273; 340/667; 177/136, 144, 154–158, 170, 171, 187, 256–259, 188; 701/45

(56) References Cited

U.S. PATENT DOCUMENTS

| | | | |
|---|---|---|---|
| 5,573,269 A | 11/1996 | Gentry et al. ............... | 280/735 |
| 6,069,325 A | 5/2000 | Aoki ........................... | 177/136 |
| 6,161,891 A * | 12/2000 | Blakesley ................ | 296/65.01 |
| 6,243,634 B1 * | 6/2001 | Oestreicher et al. .......... | 701/45 |
| 6,244,116 B1 * | 6/2001 | Osmer et al. .......... | 73/862.474 |
| 6,467,361 B2 * | 10/2002 | Rainey et al. ......... | 73/862.637 |

FOREIGN PATENT DOCUMENTS

| | | |
|---|---|---|
| DE | 4442841 A1 | 6/1995 |
| DE | 19741451 A1 | 3/1999 |
| JP | 11 304579 | 11/1999 |
| WO | WO98/25112 | 6/1998 |
| WO | WO99/24285 A1 | 5/1999 |

\* cited by examiner

*Primary Examiner*—Max Noori
(74) *Attorney, Agent, or Firm*—Foley & Lardner LLP

(57) ABSTRACT

To provide a seat weight measuring apparatus having advantages such as reduced production cost and assembling cost. The seat weight measuring apparatus comprises a seat frame for supporting the seat and a load sensor attached on the seat frame. The seat frame is provided with blocks respectively on the lower surfaces of the front ends of the left and right seat rails fixed thereon, and vehicle body mounting brackets are pivotally connected to the blocks. A load sensor is disposed under the front end of the load transmitting plate of the rear frame mounted on the rear ends of the seat rails. In the seat weight measuring apparatus in such a structure, the seat weight is supported at three points of; the pivotally connected portions at the front ends on the left and right sides and the load sensor at the rear center so as to be horizontal with respect to the floor of the vehicle body. Since there is provided a single load sensor, the production cost and the assembling/wiring cost are reduced in comparison with the related art.

13 Claims, 9 Drawing Sheets

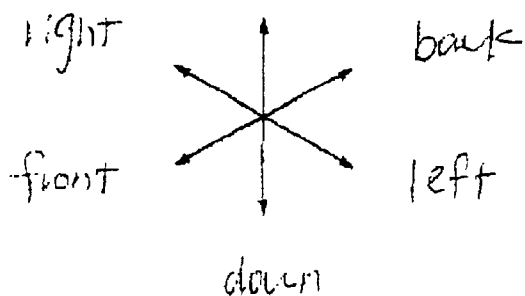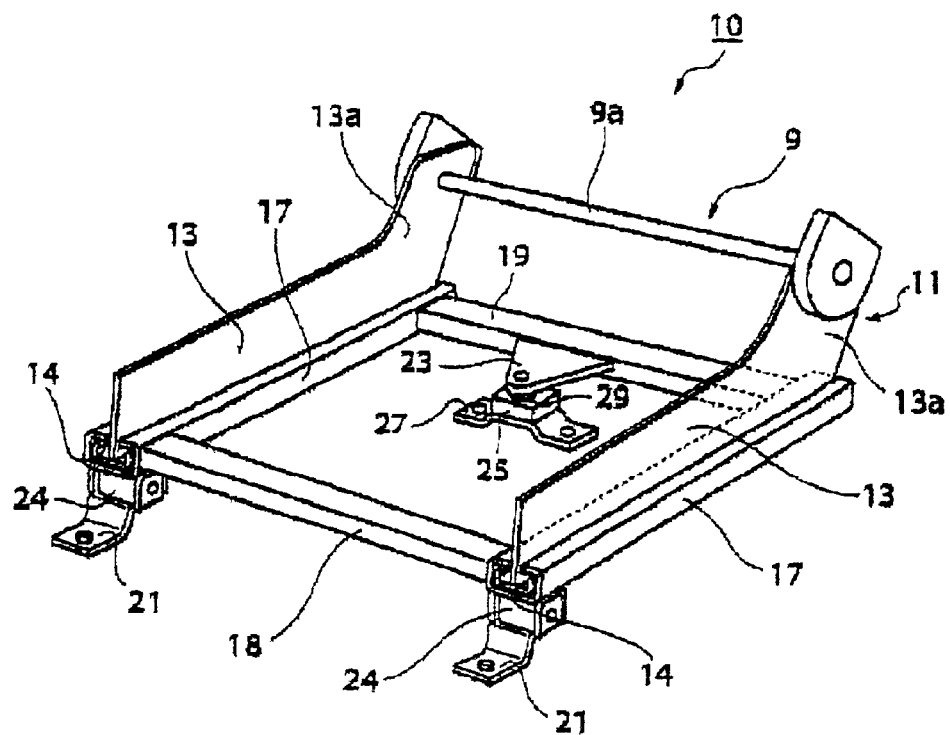

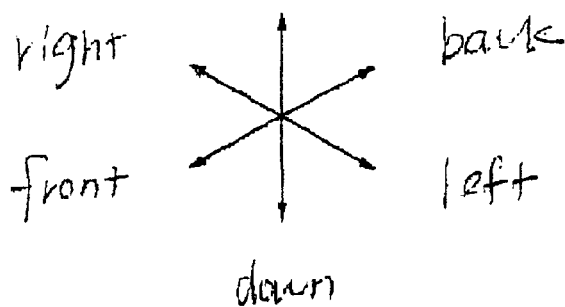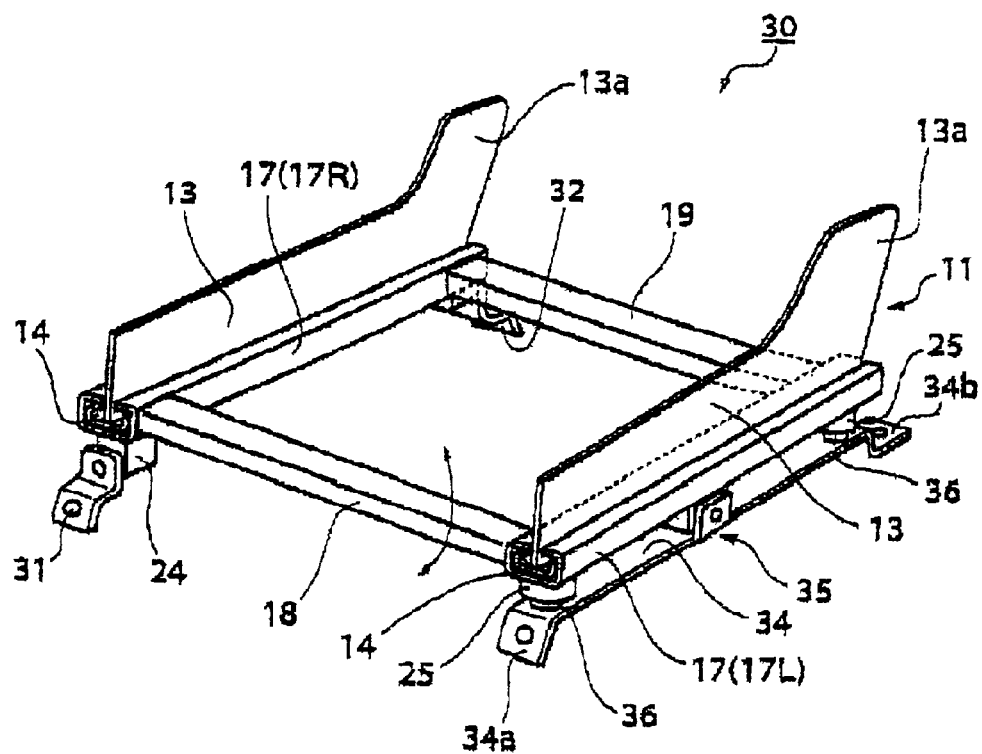

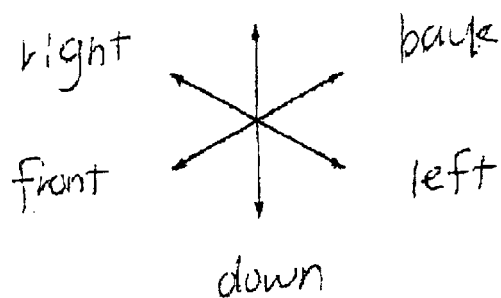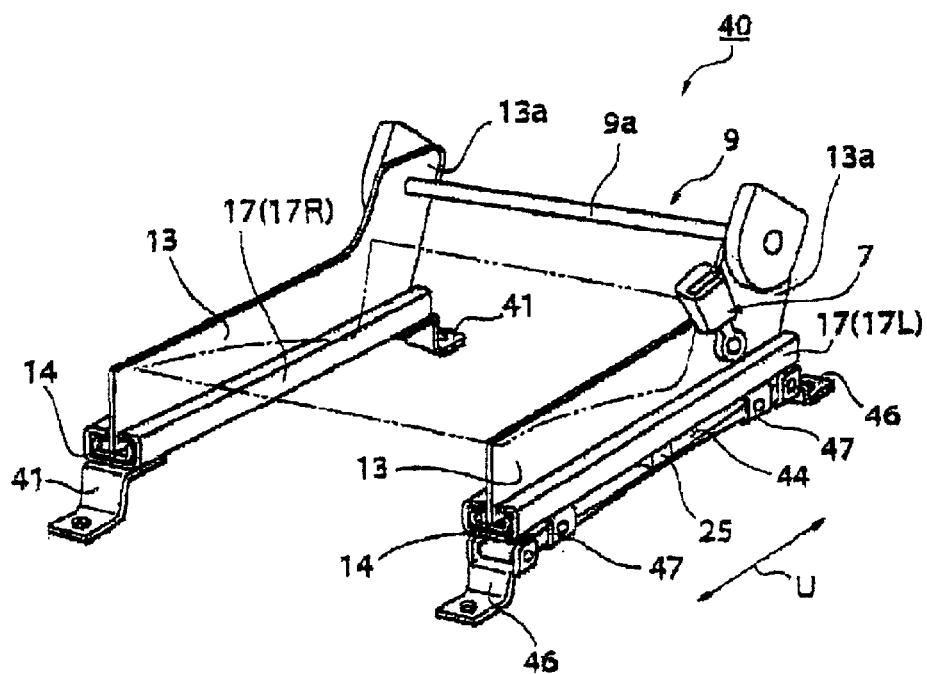

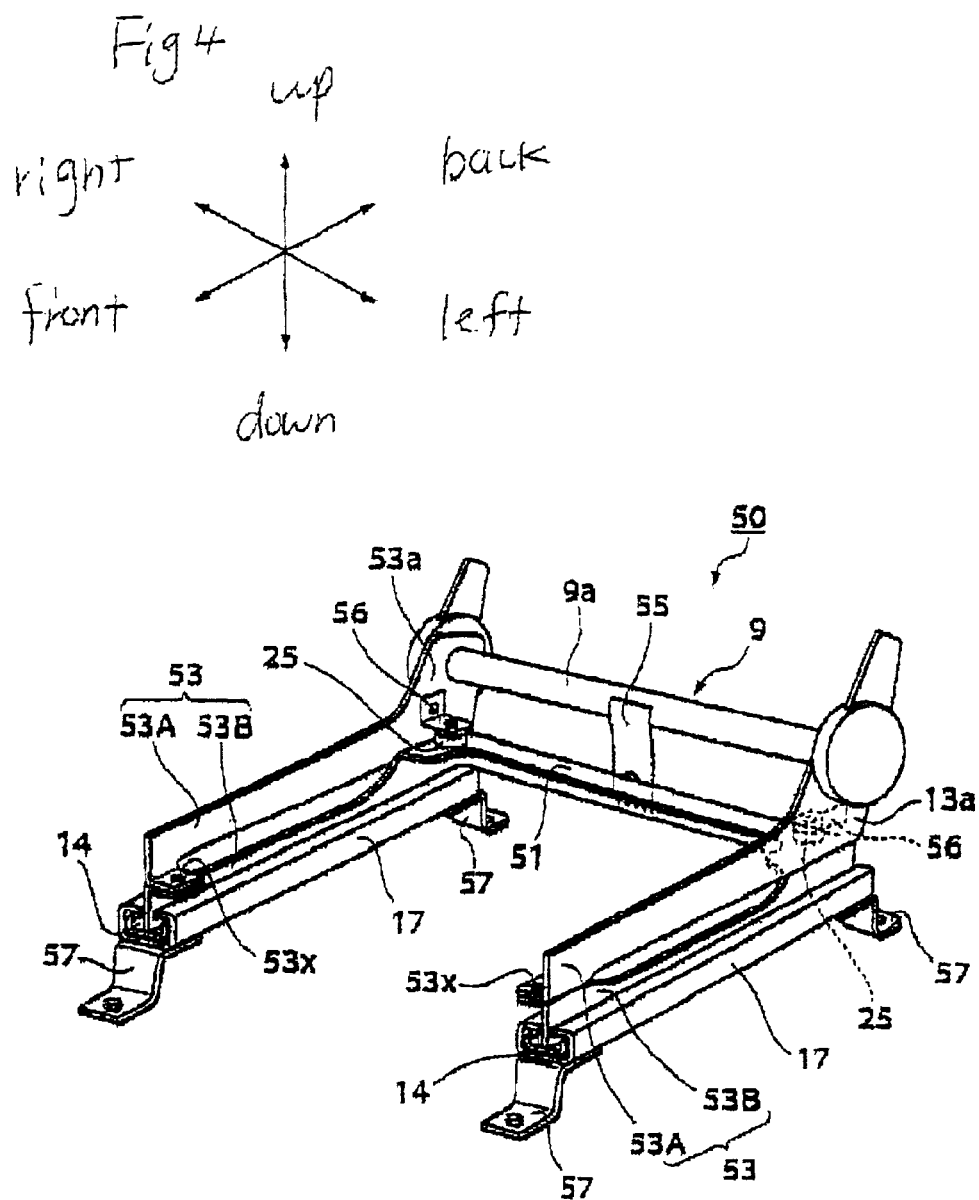

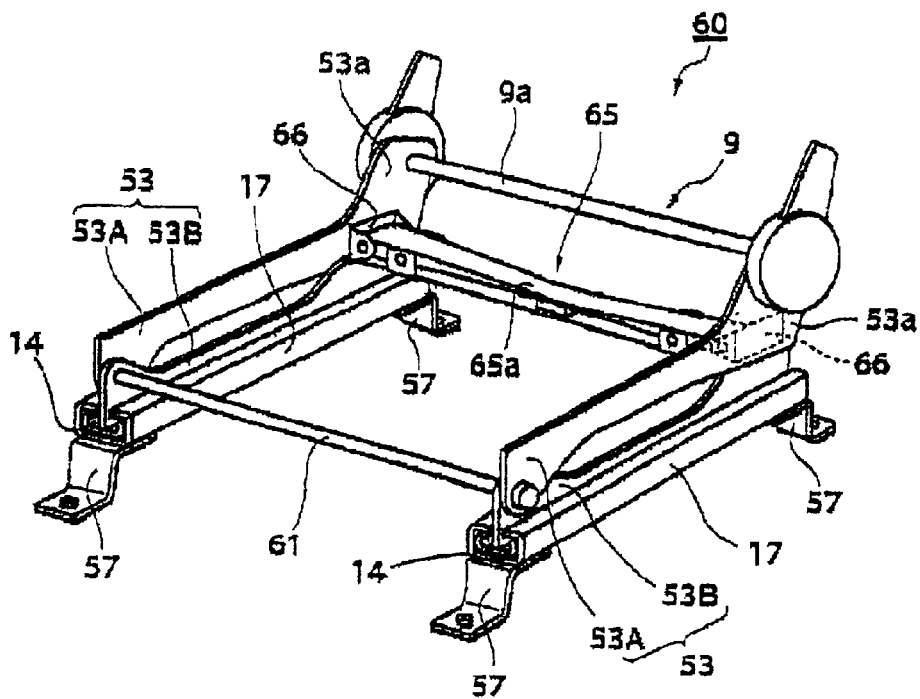

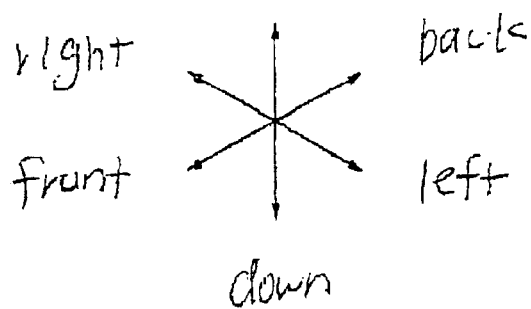
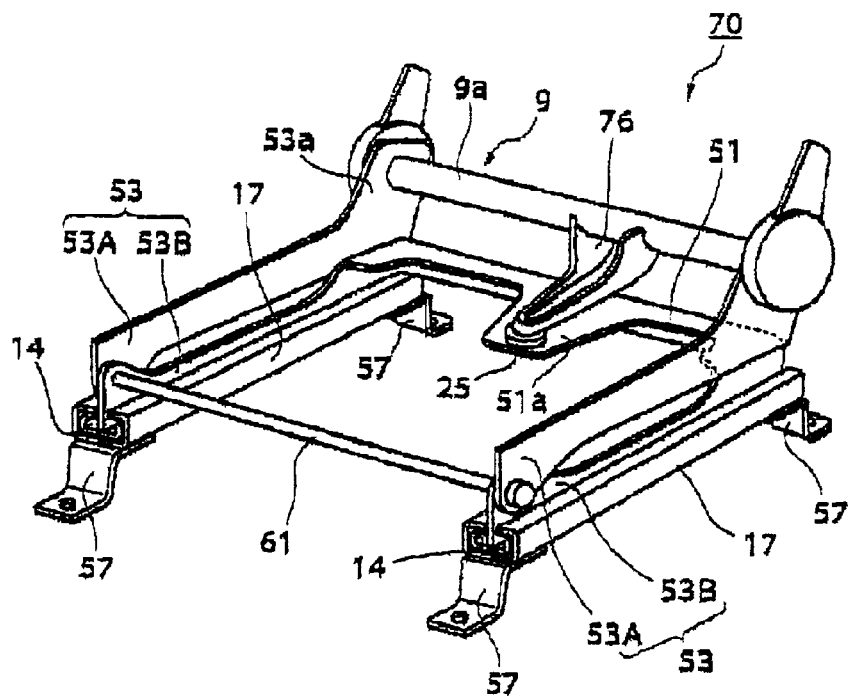

Fig 8
output of load sensor (A)
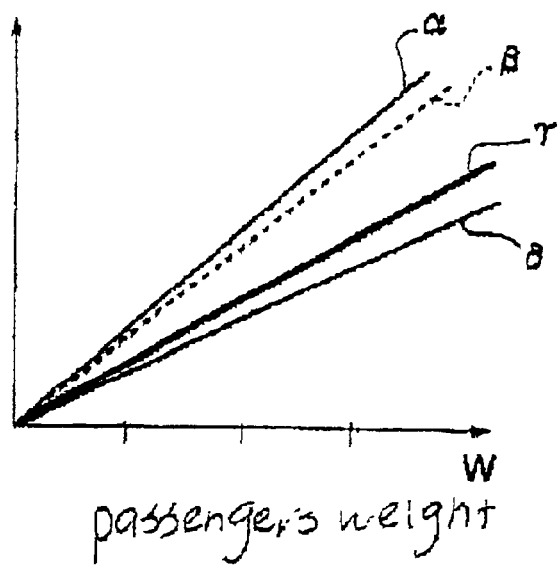
passenger's weight
output of load sensor (B)
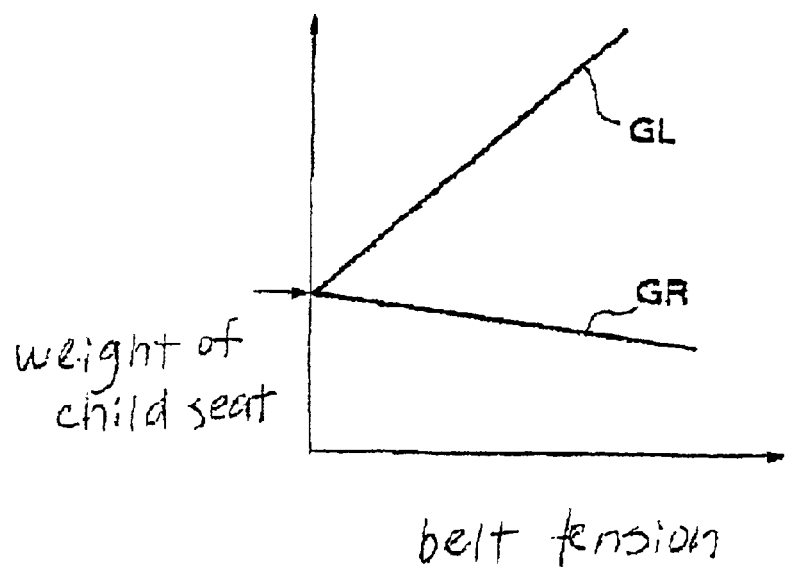
weight of child seat
belt tension

SEAT WEIGHT MEASURING APPARATUS

This application is related to U.S. Provisional Patent Application No. 60/163,388, filed Nov. 4, 1999, the disclosure of which is hereby incorporated by reference.

BACKGROUND OF THE INVENTION

1. Field of the Invention

The present invention relates to an apparatus for measuring the seat weight including the weight of a passenger seated on the car seat and, more specifically, to a seat weight measuring apparatus having advantages including that the production cost and the assembling cost of such apparatuses may be reduced.

2. Description of the Related Art

Automotive vehicles are equipped with seat belts and air bags as equipment for ensuring the safety of the passenger. In recent years, an effort has been underway to enhance the performance of the seat belt and/or the air bag by controlling these devices in accordance with the weight or the posture of the passenger. For example, the quantity of gas used to deploy the air bag or the speed of deployment could be controlled. Further, the amount of pretension of the seat belt could be adjusted in accordance with the weight and posture of the passenger. To this end, it is necessary to know the weight of the passenger sitting on the seat by some technique. The position of the center of gravity of the passenger sitting on the seat could also be referenced in order to estimate the posture of the passenger.

As an example of a technique to determine the weight or the center of gravity of the passenger of this type, a method of measuring the seat weight including the passenger's weight by disposing the load sensors (load cells) at the front, rear, left and right corners under the seat and summing vertical loads applied to the load cells has been proposed in Japanese Unexamined Patent Application Publication No. H11-304579, the disclosure of which is hereby incorporated by reference. Through this proposed method, the position of the center of gravity of the passenger sitting on the seat can be known.

Since a seat weight measuring apparatus of this type is intended for use in general automotive vehicles, the cost of the apparatus must be as low as possible. In addition, the wiring and assembly also must be easy. Keeping such subjects in mind, the object of the present invention is to provide a seat weight measuring apparatus having such advantages that the production cost and the assembling cost may be reduced.

SUMMARY OF THE INVENTION

Accordingly, a first embodiment of the present invention is a seat weight measuring apparatus for measuring the weight of the passenger sitting on the seat applied to the seat wherein a load sensor is installed at one location where the seat is fixed to the vehicle body, for measuring a part of the load applied to the seat including the seat back and the sitting surface of the seat.

According to this embodiment of the invention, because a load sensor is installed only at a single location of the seat, the production cost and the assembling/wiring cost may be reduced in comparison with the related art.

The object of the seat weight measuring apparatus stated in this specification is basically to measure the weight of the passenger sitting on the seat. Therefore, the apparatus for measuring only the weight of the passenger by canceling the net weight of the seat is included in the seat weight measuring apparatus stated in this specification.

The seat weight measuring apparatus according to a second embodiment of the present invention is a seat weight measuring apparatus for measuring the weight of the passenger sitting on the seat applied to the seat, further comprising a load sensor installed at one of the left and right seat frames at a portion of the seat at which the seat is fixed to the vehicle body, and a restraining mechanism for restraining a part of force applied to said load sensor within said seat frame. Because the impact or the like applied to the load sensor is restrained by the restraining mechanism, the load sensor is prevented from being damaged.

The seat weight measuring apparatus of the present invention may further comprise a position sensor for detecting the position of said passenger on the seat. Taking the result detected by the position sensor makes the result detected by the load sensor more accurate.

Another embodiment of the invention is a seat weight measuring apparatus wherein a load sensor is installed on the seat frame on which the buckle of the seat belt is fixed in order to reduce the effect of the restraint of the passenger by the seat belt on the detection of the load.

Another embodiment of the present invention is a seat weight measuring apparatus wherein the restraining mechanism selectively transmits only the load in the vertical direction with respect to the car body to the load sensor.

Another embodiment of the present invention is a seat weight measuring apparatus wherein the restraining mechanism includes a displacing mechanism so that a load applied to the load sensor by the impact applied to the seat or the deformation of the seat is mechanically restrained.

Another embodiment of the present invention is a seat weight measuring apparatus wherein a load sensor for measuring the load applied to the seat frame and a restraining mechanism are installed between the frame of the seat rail and the seat mounting portion to be attached to the vehicle body.

Another embodiment of the present invention is a seat weight measuring apparatus wherein a load sensor for measuring the load applied to the seat frame and a restraining mechanism are installed between the slide frame of the seat rail and the seat frame comprising a seat pan and seat back joined together.

BRIEF DESCRIPTION OF THE DRAWINGS

FIG. 1 is a perspective view showing the whole structure of a seat weight measuring apparatus according to a first embodiment of the present invention.

FIG. 2 is a perspective view showing the whole structure of a seat weight measuring apparatus according to a second embodiment of the present invention.

FIG. 3 is a perspective view showing the whole structure of a seat weight measuring apparatus according to a third embodiment of the present invention.

FIG. 4 is a perspective view showing the whole structure of a seat weight measuring apparatus according to a fourth embodiment of the present invention.

FIG. 5 is a perspective view showing the whole structure of a seat weight measuring apparatus according to a fifth embodiment of the present invention.

FIG. 6 is a perspective view showing the whole structure of a seat weight measuring apparatus according to a sixth embodiment of the present invention.

FIGS. 8(a) and 8(b) are graphs explaining the principle of measurement of the seat weight. FIG. 8(a) is a graph showing the relation between the passenger's weight and the output of the load sensor and FIG. 8(b) is a graph showing the relation between the tension of the seat belt and the output of the load sensor.

DETAILED DESCRIPTION OF THE PREFERRED EMBODIMENT

Figure 7:
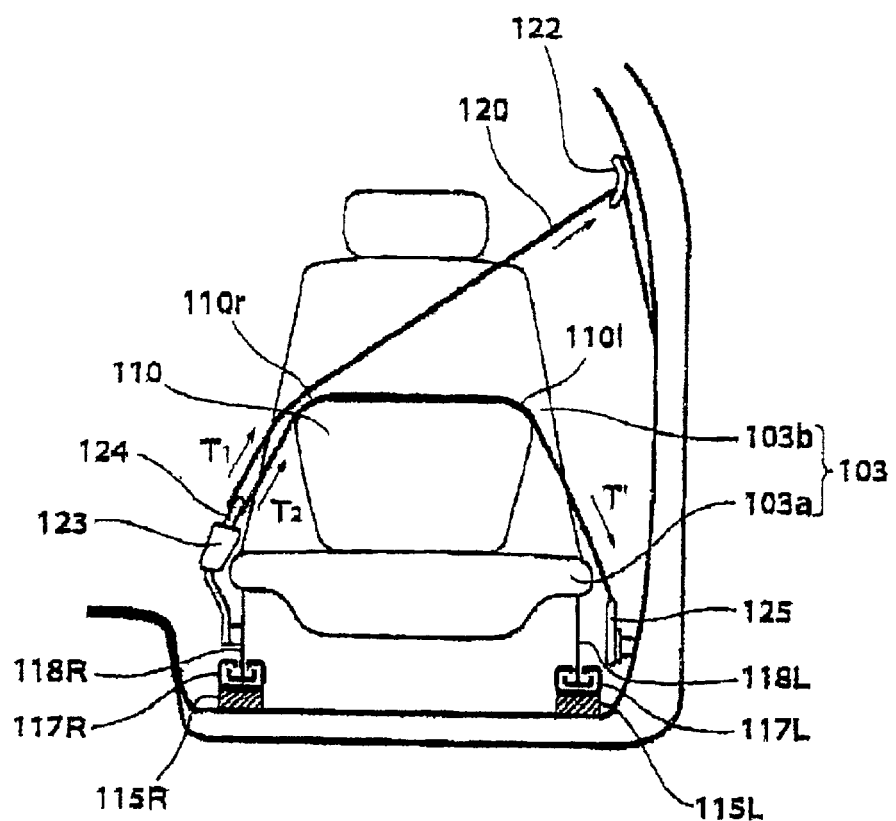
FIG. 7 is a schematic front view showing a state in which a child seat is mounted on the seat by the seat belt.

Referring now to the drawings, the present invention will be described.

Figure 9:
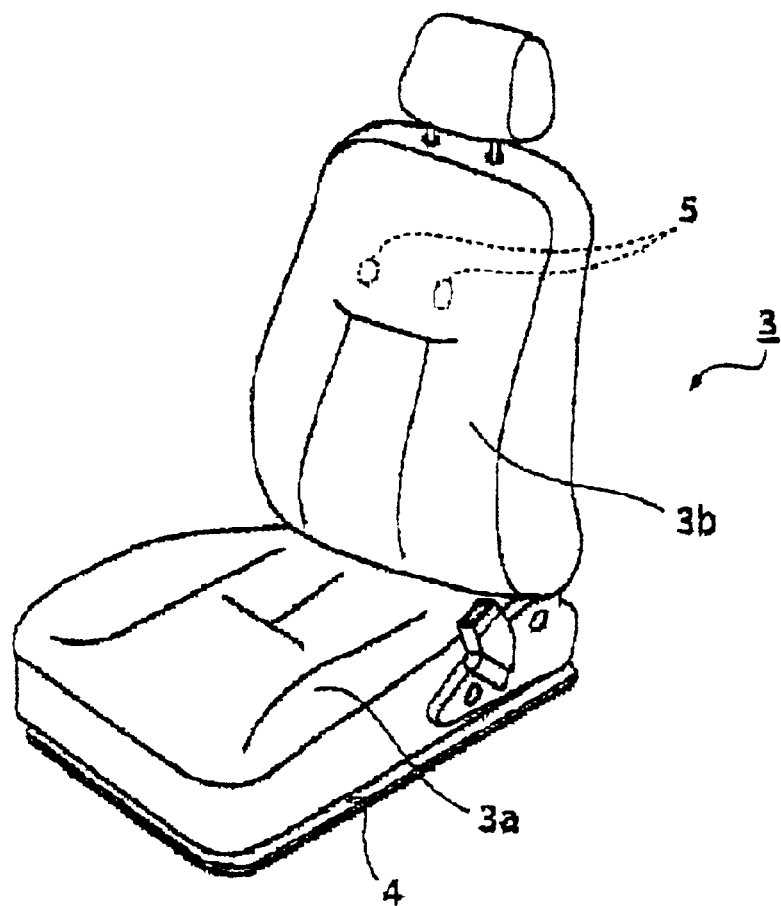
FIG. 9 is a schematic front view showing an example of the structure of an automotive seat.

As an initial matter, the structure of the seat of the automotive vehicle will be described referring to FIG. 9. FIG. 9 is a schematic front view showing an example of the structure of the seat of the automotive vehicle. The seat 3 shown in FIG. 9 comprises a seat cushion 3a on which the passenger sits, and a seat back 3b against which the passenger leans. The bottom plate 4 is attached on the lower surface of the seat cushion 3a. The bottom plate 4 spreads over the lower surface of the seat cushion 3a.

The seat 3 is attached on the bottom of the vehicle body via the seat weight measuring apparatus as shown in FIG. 1 to FIG. 6. The seat weight measuring apparatus comprises a seat frame for supporting the seat 3 and a load sensor attached on the seat frame. Referring to FIG. 1 to FIG. 6, the seat weight measuring apparatus will be described. In the following description, the word; upward, downward, forward, backward, left and right mean the directions respectively as follows. Upward and downward: the upward and downward directions from the vehicle body, forward: the direction in which the vehicle advances, backward: the direction in which the vehicle moves backward, left: the left side of the vehicle body facing toward the direction of advancement, and right: the right side of the vehicle body facing toward the direction of advancement.

First Embodiment

FIG. 1 is a perspective view showing the whole structure of the seat weight measurement apparatus according to a first embodiment of the present invention.

As shown in FIG. 1, the seat frame 11 of the seat weight measuring apparatus 10 comprises left and right longitudinal plates 13 extending in the forward and backward directions. Each longitudinal plate 13 is in the shape of a slab and a rear end portion 13a thereof is rising in the upper rear direction. The rear end portion 13a is provided with a reclining mechanism 9 to be integrated within the seat (see FIG. 9) pivotally mounted thereon. There is provided a shaft 9a of the reclining mechanism 9 extended between the left and right longitudinal plates 13. Each longitudinal plate 13 is provided with a sliding plate 14 fixed at the lower end thereof. The sliding plate 14 is U-shaped in cross-section. The lower end of the longitudinal plate 13 is fixed to the inner center of the sliding plate 14 so as to form a T-shape in cross-section.

The seat frame 11 is provided with seat rails 17 corresponding to the respective left and right plates 13 and the sliding plates 14. The seat rails 17 extend in the forward and backward directions in parallel to each other under the left and right sides of the seat 3 (see FIG. 9). Each seat rail 17 is U-shaped in cross-section. A sliding plate 14 within each seat rail 17 is provided and a longitudinal plate 13 is provided in the opening in the shape of a groove formed on the upper portion of the seat rail 17. The slide plate 14 slides in the seat rail 17 in the forward and backward directions. A front frame 18 and a rear frame 19 are laid between the left and right seat rails 17 at the front ends and the rear ends.

Blocks 24 are fixed on the lower surface of the front ends of the left and right seat rails 17, respectively. The block 24 is provided with a pivotally mounted vehicle body mounting bracket 21. The vehicle body mounting bracket 21 is used for fixing the seat rail 17 to the bottom portion of the vehicle body. Since the bracket 21 is pivotally connected to the block 24, the seat rail 17 can be warped in the upward and downward directions.

The left and right seat rails 17 are provided with a load transferring plate 23 fixed at the center of the rear frame 19 on the rear end sides thereof. The load transferring plate 23 projects toward the front from the side surface of the rear frame 19. The load transferring plate 23 is provided with a load sensor 25 under the front end thereof. The load sensor 25 is fixed on the bottom surface of the vehicle body via a bracket 27. A spring 29 is interposed between the load sensor 25 and the load transferring plate 23. The load sensor 25 may be the one disclosed in Japanese Unexamined Patent Application Publication No. H11-351952.

In the seat weight measuring apparatus 10 having such a structure, the seat weight is supported by the three points of: the pivotally connected portions at the front on the left and right sides (between the block 24 and the vehicle body mounting bracket) and the load sensor portion (load transferring plate 23, load sensor 25, bracket 27 and spring 29) mounted at the center of the rear side so as to be horizontal with respect to the floor surface of the vehicle body. Because only one load sensor 25 provided, the production cost and the assembling/wiring cost may be reduced in comparison with the related art.

In the seat weight measuring apparatus 10 of the first embodiment, when the seat weight is detected by the load sensor 25, the value detected by the touch or position sensor 5 (which may hereinafter be referred to as the position sensor 5 or the touch sensor 5) integrated in the seat back 3b of the seat 3 as shown in FIG. 9 is taken into consideration. The touch sensor 5 is used for detecting the position of the passenger on the seat (unbalanced positioning of the passenger such as one side, front side, or back side sitting, etc.). By including the touch sensor 5, variations in detected values of the seat weight due to the variations in positioning of the passenger on the seat 3 can be corrected.

The action of the seat weight measuring apparatus 10 will now be described. The load applied to the seat 3 is transmitted to the seat rail 17 via the longitudinal plate 13 and the slide plate 14. Then the load in turn is dispersively transmitted to three points of: the pivot connecting portion at the front ends of the left and right seat rails 17 and the load sensor portion at the center of the rear frame laid between the rear ends of the seat rails 17. The load moves the seat rail 17 pivotally with respect to the bottom portion of the vehicle body at the pivotally connected portion. On the other hand, the load is applied from the load transmitting plate 23 via the spring 29 to the load sensor 25 at the load sensor portion. The seat weight is measured based on the load applied to the load sensor 25. In this case, the seat weight is detected with the detected value detected by the touch sensor 5 of the seat back 3b of the seat 3 (the positional state of the passenger on the seat 3) taken into consideration.

A load sensor 25 in alternative examples may be the one disclosed in Japanese Unexamined Patent Application Publication No. H11-304579.

Second Embodiment

FIG. 2 is a perspective view showing the whole structure of the seat weight measuring apparatus according to a second embodiment of the present invention. (The reclining mechanism is not shown in FIG. 2, but may be included.) The seat weight measuring apparatus 30 shown in FIG. 2 comprises a seat frame 11 (a longitudinal plate 13, a slide plate 14, a seat rail 17, and the front and rear frames 18, 19) as in the seat weight measuring apparatus 10 of FIG. 1. A Z-shaped vehicle body mounting bracket 31 is pivotally connected to the front end of the right seat rail 17R of the seat weight measuring apparatus 30 via the block 24. A vehicle body mounting bracket 32 is pivotally connected to the bottom surface on the rear end of the same right seat rail 17R. The right seat rail 17R is fixed, on the bottom surface of the vehicle body via the front and rear vehicle body mounting brackets 31, 32. These brackets 31, 32 may be the fixed brackets.

Under the left seat rail 17L of the seat weight measuring apparatus 30, there is provided a rail bracket 34. The front and rear ends 34a, 34b of the rail bracket 34 is intended for attachment to the vehicle body. The load sensors 25 are fixed between the lower surface of the left seat rail 17L and the rail bracket 34 in the vicinity of both front and rear ends. A rubber damper 36 is interposed between the lower surface of each load sensor 25 and the upper surface of the rail bracket 34. There is further provided a load restraining mechanism 35 between the lower surface of the left seat rail 17L and the rail bracket 34 at the center of the length thereof. The load restraining mechanism 35 serves to limit the amount of warp of the left seat rail 17L, thereby restraining the load applied to the load sensor 25.

In the seat weight measuring apparatus 30 of the second embodiment, the seat weight is supported by four points of: the pivotally connected portions (blocks 24 and the vehicle body mounting brackets 31, 32) at the front and rear ends of the right seat rail 17R and the load sensors 25 at the front and rear ends of the left seat rail 17L. The load applied to the right seat rail 17R is absorbed by the pivotal movement of the right seat rail at the pivotally connected portion. On the other hand, the load applied to the left seat rail 17L is received by the load sensor 25. In this case, the load restraining mechanism 35 restrains the load such as the impact or the like applied to the load sensor 25. The seat weight is measured based on the load applied to the load sensor 25.

Third Embodiment

FIG. 3 is a perspective view showing the whole structure of the seat weight measuring apparatus according to a third embodiment of the present invention. In FIG. 3, a reclining mechanism 9 and the buckle 7 are also shown. The seat weight measuring apparatus 40 shown in FIG. 3 comprises longitudinal plates 13, sliding plates 14, and seat rails 17 as in the seat weight measuring apparatuses 10 and 30 shown in FIG. 1 and FIG. 2. At the front and rear ends of the right seat rail 17R of the seat weight measuring apparatus 40 is fixed with the Z-shaped vehicle body mounting brackets 41 respectively.

On the other hand, a lever arm 44 is provided under the left seat rail 17L. The left seat rail 17L and the lever arm 44 are pivotally connected at the two points near the front end and the rear end via connecting brackets 47. The front and rear ends of the lever arm 44 are provided with the vehicle body mounting bracket 46 pivotally connected thereto. A load sensor 25 is disposed between the lower surface of the left seat rail 17L and the lever arm 44 at the center of the length thereof. In the case of this seat weight measuring apparatus 40, the front portion U between the lower surface of the left seat rail 17L and the lever arm 44 serves as a load restraining mechanism 35.

In the seat weight measuring apparatus 40 of the third embodiment, the seat weight is supported by the vehicle body mounting brackets 41 at the front and rear ends of the right seat rail 17R, a pivotally connected portion of the left seat rail 17L (connecting bracket 47 and the vehicle body mounting bracket 46), and a load sensor 25. The seat weight is measured based on a load added to the load applied to the left seat rail 17L detected by the load sensor 25. In this case, the seat weight is detected with the positional state of the passenger on the seat 3 detected by the touch sensor 5 of the seat back 3b of the seat 3, as in the case of the first embodiment.

Fourth Embodiment

FIG. 4 is a perspective view showing the whole structure of the seat weight measuring apparatus according to a fourth embodiment of the present invention. The seat weight measuring apparatus 50 in FIG. 4 has such a structure that the longitudinal plate 53 is divided into two portions of the upper longitudinal plate 53A and the lower longitudinal plate 53B. The reclining mechanism 9 of the seat is pivotally mounted on the rear end portion 53a of the upper longitudinal plate 53A. The rear end portions of the left and right lower longitudinal plates 53B are unitarily connected by the connecting frame 51. A sliding plate 14 is fixed on the lower end of each lower longitudinal plate 53B. The upper and lower longitudinal plates 53A, 533 are connected at the connecting section 53x by-spot fixation or pivotal connection.

The structure of the sliding plate 14 and the seat rail 17 is the same as the first to third embodiments described above.

L-shaped contact points 56 are fixed on the inner sides of the rear ends of the left and right upper longitudinal plates 53A. Load sensors 25 are provided respectively between these left and right contact points 56 and the connecting frame 51. A load restraining mechanism 55 is provided between the connecting frame 51 and the shaft 9a of the reclining mechanism 9.

Z-shaped vehicle mounting brackets 57 are mounted respectively under the front and rear ends of the right and left seat rails 17. These vehicle mounting brackets 57 support the seat weight measuring apparatus 50 of the present embodiment at four points.

In the seat weight measuring apparatus 50 of the fourth embodiment, the connecting sections 53x of the longitudinal plates 53 serve as resilient pivots for the upper longitudinal plates 53A with respect to the lower longitudinal plates 53B. In other words, the rear end portions of the upper longitudinal plates 53A pivot with respect to the lower longitudinal plate 533 with the connecting sections 53x as fulcrums. The amount of pivotal movement of the upper longitudinal plates 53A is transmitted to the load sensors 25 via a contact points 56 to measure the seat weight.

The structure as in the fourth embodiment (a moving mechanism at the rear end of the seat by the longitudinal plates 53 and the connecting sections 53x) may be applied to all other embodiments.

Fifth Embodiment

FIG. 5 is a perspective view of the whole structure of the seat weight measuring apparatus according to a fifth embodiment of the invention. The seat measuring apparatus 60 shown in FIG. 5 differs from the seat weight measuring apparatus 50 of the fourth embodiment shown in FIG. 4 in the following points.

(1) There is provided a shaft 61 extending from the left to right between the front ends of the upper longitudinal plates 53A and the lower longitudinal plates 53B. The both ends of the shaft 61 are pivotally connected to the upper and lower longitudinal plates 53A and 53B. The upper longitudinal plates 42A are pivotable with respect to the lower longitudinal plates 53B with the shaft 61 as a fulcrum. The rear ends of the left and right lower longitudinal plates 53B are not connected.

(2) Instead of the contact point 56 and the load sensor 25, there is provided an elongated box-shape sensor 65 between the left and right upper longitudinal plates 53A via a brackets 66. The elongated box-shape sensor 65 may be the one disclosed in Japanese Unexamined Patent Application Publication No. 11-351952. In the elongated box-shape sensor 65, the lever 65a serves as a contact point instead of the contact point 56.

In the seat weight measuring apparatus 60 of this type, the pivotally connected portions on the both ends of the shaft 61 and the brackets 66 on the left and right ends of the elongated box-shape sensor 65 serve as a load restraining mechanism.

In the seat weight measuring apparatus 60 of the fifth embodiment, the both ends of the shaft 61 serve as resilient pivots for the upper longitudinal plates 53A with respect to the lower longitudinal plates 53B. In this case, the amount of the pivotal movement of the upper longitudinal plates 53A is directly transmitted to the elongated box-shape sensor 65 to measure the seat weight.

Sixth Embodiment

FIG. 6 is a perspective view showing the whole structure of the seat weight measuring apparatus according to the sixth embodiment of the present invention. The seat weight measuring apparatus 70 of FIG. 6 differs from the seat weight measuring apparatus 50 of the fourth embodiment shown in FIG. 4 in the following points.

(1) There is provided a shaft 61 between the front ends of the upper longitudinal plates 53A and the lower longitudinal plates 53B as in the seat weight measuring apparatus 60 according to the fifth embodiment shown in FIG. 5.

(2) An overhanging portion 51a is formed in the center of the connecting frame 51 connecting between the left and right lower longitudinal plates 53B. On the upper surface of the overhanging portion 51a, there is provided a load sensor 25.

(3) Instead of the contact point 56, there is provided a contact point 76 extending from the shaft 9a of the reclining mechanism 9 to the load sensor 25 on the upper surface of the overhanging portion 51a.

In such a seat weight measuring apparatus 60, the pivotally connected portions on the both ends of the shaft 61 serve as a load restraining mechanism. Both ends of the shaft 61 serve as resilient pivots for the upper longitudinal plates 53A with respect to the lower longitudinal plates 53B. In this case, the amount of the pivotal movement of the upper longitudinal plates 53A with respect to the lower longitudinal plates 53B is transmitted from the contact point 76 to the load sensor 25 on the upper surface of the overhanging portion 51a to measure the weight of the seat.

An example of measurement of the seat weight from the load applied to the seat rail will now be described.

FIG. 7 is a schematic front view showing a state in which the child seat is mounted on the seat using the seat belt.

FIG. 8 are graphs explaining the principle of measurement of the seat weight. FIG. 8(a) is a graph showing the relation between the passenger's weight and the output of the load sensor, and FIG. 8(b) is a graph showing the relation between the tension of the seat belt and the output of the load sensor.

The seat 103 shown in FIG. 7 comprises a seat cushion 103a on which the passenger sits and a seat back 103b against which the passenger leans. A child seat 110 is placed on the seat 103. The child seat 110 is fixed on the seat 103 by means of the seat belt 120. The seat belt 120 extends from a retractor (not shown) via a deflector 122 and a tongue 124 connected to the buckle 123, and then passes over the child seat 110, and attaches to the anchor 125.

There are provided a seat frame for the seat weight measuring apparatus (left and right longitudinal plates 118L, 118R and the left and right seat rails 117L, 117R), and the left and right load sensors 115L and 115R under the lower surface of the seat 103. The buckle 123 is mounted on the side of the right longitudinal plate 118R.

Referring now to FIG. 8(A), the principle of measurement of the seat weight will be described. The axis of abscissa represents the passenger's weight, and the axis of ordinate represents the output of the load sensor.

The seat weight is transmitted to the left and right load sensors 115L, 115R via the seat frame. The seat weight in this case is the sum of the measurements measured by the left and right load sensors 115L and 115R respectively. The sum of these measurements is shown by β and γ in FIG. 8(A). β denotes the maximum value of the sum of the measurements measured by the left and right load sensors 115L and 115R, and γ denotes the minimum value of the same. When the passenger is sitting straight with his/her legs kept away from the floor, the entire weight of the passenger is applied on the seat and the passenger's weight can be properly measured. The measurement in this case is the maximum value β. On the other hand, when the passenger changes his/her posture and presses his/her legs against the floor, the weight measured at the seat reduces and shows the minimum value γ. When the passenger's weight is measured in the normal seat, the weight values of the passenger measured are within this range.

On the other hand, α and δ shown in FIG. 8(A) denote twice the values measured by the right load sensor 115R. α denotes the maximum value and δ denotes the minimum value. As shown in the graph, γ and δ, α and β show the close inclinations respectively as far as the passenger is sitting straight though the error increases to some extent, and the sum of the measurements measured by the left and right load sensors 115L and 115R is almost twice the measurement measured by the right load sensor 115R. Therefore, in actual fact, it is not necessary to provide two load sensors on the right and left, and thus the seat weight can be measured by doubling the measurement of a single right load sensor 115R on the same side as the buckle 123.

Referring now to FIG. 8(B), the effect of the belt tension on the output of the load sensor will be described. The axis of abscissa in FIG. 8(B) represents the belt tension, and the axis of ordinate represents the output of the load sensor.

The graph GR shows the output value of the right load sensor 115R and the graph GL shows the output of the left load sensor. As clearly shown in the graph GR, the output value of the sensor corresponding to the seat weight changes little even when the belt tension increases. On the other hand, as shown in the graph CL, the output value of the sensor corresponding to the seat weight linearly increases with the increase of the belt tension. Therefore, the right load sensor 115R (on the side where the buckle 123 is mounted) is not susceptible to the belt tension, but the left load sensor 115L, is susceptible to the belt tension.

The effect of a child seat will be described now. As shown in FIG. 7, when the child seat 110 is on the seat 103, a downward force by the tension of belt 120 acts on the child seat 110. At this time, right seat frame (the right longitudinal plate 118R, right seat rail 117R) is acted upon by the tensile strength T1 that pulls upwardly from the tongue 124 toward the deflector 122 and the tensile strength T2 that pulls upwardly from the tongue 124 toward the upper right edge 110R of the child seat 110. However, because T1+T2 that acts downwardly is applied to the upper right edge 110R of the child seat 110, the upward and downward force that is applied to the right seat frame is compensated in actual fact. On the other hand, the tensile strength T' that pulls downwardly is always applied to the upper left edge 110L of the child seat 110.

Therefore, the right load sensor 115R is not susceptible to the belt tension at the time of measurement since the belt tension is compensated. Therefore, measurement of the seat weight from the output of the right load sensor 115R that is not susceptible to the belt tension has reliability.

This seat weight measuring method is applied only when the child seat 110 is mounted. In other words, in the case where the passenger is a standard adult, the seat belt 120 is worn in an adequate manner, and thus the belt tension as described above is not necessary to be taken into consideration. However, when the child seat 120 is mounted the belt tension applied may vary between the left side and right side of the seat 103 depending on the height of the child seat 120. Therefore, when the value measured by the right load sensor 115R is smaller than the prescribed value, that is, when a standard child is sitting, or when a child seat with a child seated thereon is mounted, the method described above is effective.

As is clear from the description given so far, according to the present invention, a seat weight measuring apparatus having an advantage in that the production cost and the assembling cost may be reduced may be provided.

While particular embodiments according to the invention have been illustrated and described above, it will be clear that the invention can take a variety of forms and embodiments within the scope of the appended claims.

I claim:

1. A seat weight measuring apparatus, applied to a seat that is mounted to a vehicle body, for measuring the weight of a passenger sitting on the seat, comprising: a load sensor, installed at a location at which the seat is mounted to the vehicle body, for measuring a part of a load applied to the seat; wherein the seat is mounted to the vehicle body by a mounting structure that permits movement of the seat in response to the load applied to the seat so that another part of the load applied to the seat is not measured by the load sensor.

2. The seat weight measuring apparatus of claim 1, wherein the seat is positioned in seat rails that permit movement of the seat relative to the seat rails.

3. A seat weight measuring apparatus, applied to a seat that is mounted to a vehicle body, for measuring the weight of a passenger sitting on the seat, comprising:
a load sensor, installed at one of left and right sides of a seat frame, for measuring a part of a load applied to the seat,
a restraining mechanism, connected to said seat frame, for limiting a force applied to said at least one load sensor, and
wherein the seat frame is mounted to the vehicle body by a mounting structure that permits movement of the other of said left and right sides of said seat frame relative to the vehicle body in response to the load applied to the seat so that another part of the load applied to the seat is not measured by the load sensor.

4. The seat weight measuring apparatus of claim 2, wherein the seat is resiliently connected to the seat rails.

5. A seat weight measuring apparatus as in claim 1, wherein the seat weight measuring apparatus comprises exactly one load sensor.

6. A seat weight measuring apparatus as in claim 3, wherein the seat weight measuring apparatus comprises exactly one load sensor.

7. A seat weight measuring apparatus for measuring the weight of a passenger in a vehicle having a body, comprising:
a seat having four sides;
at least one load sensor, installed at one of said sides, for measuring a part of a load applied to the seat, and
wherein the seat is mounted to the vehicle body by a mounting structure that permits movement of an opposing one of the sides of the seat in response to the load applied to the seat so that a part of the load applied to the seat is not measured by am the at least one load sensor.

8. A seat weight measuring apparatus as in claim 7, wherein said one of said sides is one of a left side and a right side and said opposing one of said sides is the other of the left side and the right side.

9. A seat weight measuring apparatus as in claim 7, wherein said one of said sides is one of a front side and a back side and said opposing one of said sides is the other of the front side and the back side.

10. A seat weight measuring apparatus as in claim 7, wherein the seat weight measuring apparatus comprises exactly one load sensor.

11. A seat weight measuring apparatus as in claim 7, wherein the seat weight measuring apparatus comprises exactly two load sensors installed at said one of said sides.

12. The seat weight measuring apparatus of claim 1, wherein the mounting structure includes a seat rail that is pivotally connected to the vehicle body.

13. The seat weight measuring apparatus of claim 12, wherein the mounting structure further comprises a second seat rail pivotally connected to the vehicle body.

\* \* \* \* \*